(12) United States Patent
Pedasingu et al.

(10) Patent No.: US 11,436,319 B2
(45) Date of Patent: Sep. 6, 2022

(54) AUTOMATED DETECTION OF USER DEVICE SECURITY RISKS RELATED TO PROCESS THREADS AND CORRESPONDING ACTIVITY

(71) Applicant: RSA Security LLC, Bedford, MA (US)

(72) Inventors: Vishnu C. Pedasingu, Bangalore (IN); Phaneendra Ksl, Bangalore (IN); Gaurav Bansal, Bangalore (IN)

(73) Assignee: RSA Security LLC, Bedford, MA (US)

( * ) Notice: Subject to any disclaimer, the term of this patent is extended or adjusted under 35 U.S.C. 154(b) by 303 days.

(21) Appl. No.: 16/752,825

(22) Filed: Jan. 27, 2020

(65) Prior Publication Data

US 2021/0232677 A1   Jul. 29, 2021

(51) Int. Cl.
*G06F 21/54*   (2013.01)
*G06F 21/56*   (2013.01)
*G06F 21/55*   (2013.01)

(52) U.S. Cl.
CPC ............ *G06F 21/54* (2013.01); *G06F 21/552* (2013.01); *G06F 21/566* (2013.01)

(58) Field of Classification Search
CPC ....... G06F 21/54; G06F 21/552; G06F 21/566
See application file for complete search history.

(56) References Cited

U.S. PATENT DOCUMENTS

| 9,218,488 | B2 | 12/2015 | Cher et al. |
| 9,251,340 | B2 | 2/2016 | Cher et al. |
| 9,384,148 | B2 | 7/2016 | Muttik et al. |
| 2009/0320021 | A1* | 12/2009 | Pan ............... G06F 11/0715 718/100 |
| 2019/0138648 | A1* | 5/2019 | Gupta ............... G06F 16/3325 |
| 2019/0286821 | A1* | 9/2019 | Strogov ............. G06F 21/568 |

OTHER PUBLICATIONS

Juan Carlos Martinez Santos • Yunsi Fei; HATI: Hardware Assisted Thread Isolation for Concurrent C/C++ Programs; 2014 IEEE International Parallel & Distributed Processing Symposium Workshops (pp. 322-331); (Year: 2014).*

(Continued)

*Primary Examiner* — Jahangir Kabir
*Assistant Examiner* — Chao Wang
(74) *Attorney, Agent, or Firm* — Danielson Legal LLC

(57) ABSTRACT

Methods, apparatus, and processor-readable storage media for automated detection of user device security risks related to process threads and corresponding activity are provided herein. An example computer-implemented method includes obtaining information pertaining to processes running on a user device; obtaining information pertaining to images loaded into at least one memory associated with at least one of the processes running on the user device; obtaining information pertaining to threads created in connection with at least one of the processes running on the user device; automatically identifying at least one of the threads as a security risk by processing the information pertaining to the images and the information pertaining to the threads; and performing at least one automated action based on the identification of at least one of the one or more threads as a security risk.

17 Claims, 8 Drawing Sheets

(56) References Cited

OTHER PUBLICATIONS

R. Shetty • M. Kharbutli • Y. Solihin • M. Prvulovic; HeapMon: A helper-thread approach to programmable, automatic, and low-overhead memory bug detection; IBM Journal of Research and Development (vol. 50, Issue: 2.3, pp. 261-275); (Year : 2006).*
Dept. of Comput. Sci. & Eng., Chalmers Univ. of Technol., Goteborg; Securing interaction between threads and the scheduler; 19th IEEE Computer Security Foundations Workshop (CSFW'06) (p. 13 pp. -189); (Year: 2008).*

* cited by examiner

Image information structure:
```
typedef struct tag_IMAGE_LOAD_INFO{
    LIST_ENTRY       Link;
    ULONG_PTR        ImageBase;
    SIZE_T           ImageSize;
    UNICODE_STRING   ImageName;
    WCHAR            Buffer[1];
}IMAGE_LOAD_INFO, *PIMAGE_LOAD_INFO;
```

200

FIG. 2

AUTOMATED DETECTION OF USER DEVICE SECURITY RISKS RELATED TO PROCESS THREADS AND CORRESPONDING ACTIVITY

FIELD

The field relates generally to information processing systems, and more particularly to techniques for providing security in such systems.

BACKGROUND

Adversarial attacks using file-less malware are becoming more prevalent and pose security threats to organizations. Such attacks do not involve files being placed onto a disk, and without artifacts on the disk, traditional endpoint security approaches face detection challenges. An example of such an attack includes injecting shellcode into a system process and creating a thread starting from within the shellcode. However, conventional device security approaches include performing a memory scan of all running processes to detect malicious threads running in the processes, but such a scan is typically only triggered when a human analyst manually requests the scan. Accordingly, the detection of security risks via such approaches is commonly delayed and lacks contextual information.

SUMMARY

Illustrative embodiments of the disclosure provide for automated detection of user device security risks related to process threads and corresponding activity. An exemplary computer-implemented method includes obtaining information pertaining to one or more processes running on a user device, obtaining information pertaining to one or more images loaded into at least one memory associated with at least one of the one or more processes running on the user device, and obtaining information pertaining to one or more threads created in connection with at least one of the one or more processes running on the user device. Such a method also includes automatically identifying at least one of the one or more threads as a security risk by processing the information pertaining to the one or more images and the information pertaining to the one or more threads. Further, such a method includes performing at least one automated action based at least in part on the identification of at least one of the one or more threads as a security risk.

Illustrative embodiments can provide significant advantages relative to conventional device security approaches. For example, challenges associated with detection delays are overcome in one or more embodiments through automated real-time assessment of created threads in conjunction with loaded images.

These and other illustrative embodiments described herein include, without limitation, methods, apparatus, systems, and computer program products comprising processor-readable storage media.

BRIEF DESCRIPTION OF THE DRAWINGS

FIG. 2 shows example pseudocode for creating an image information structure in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
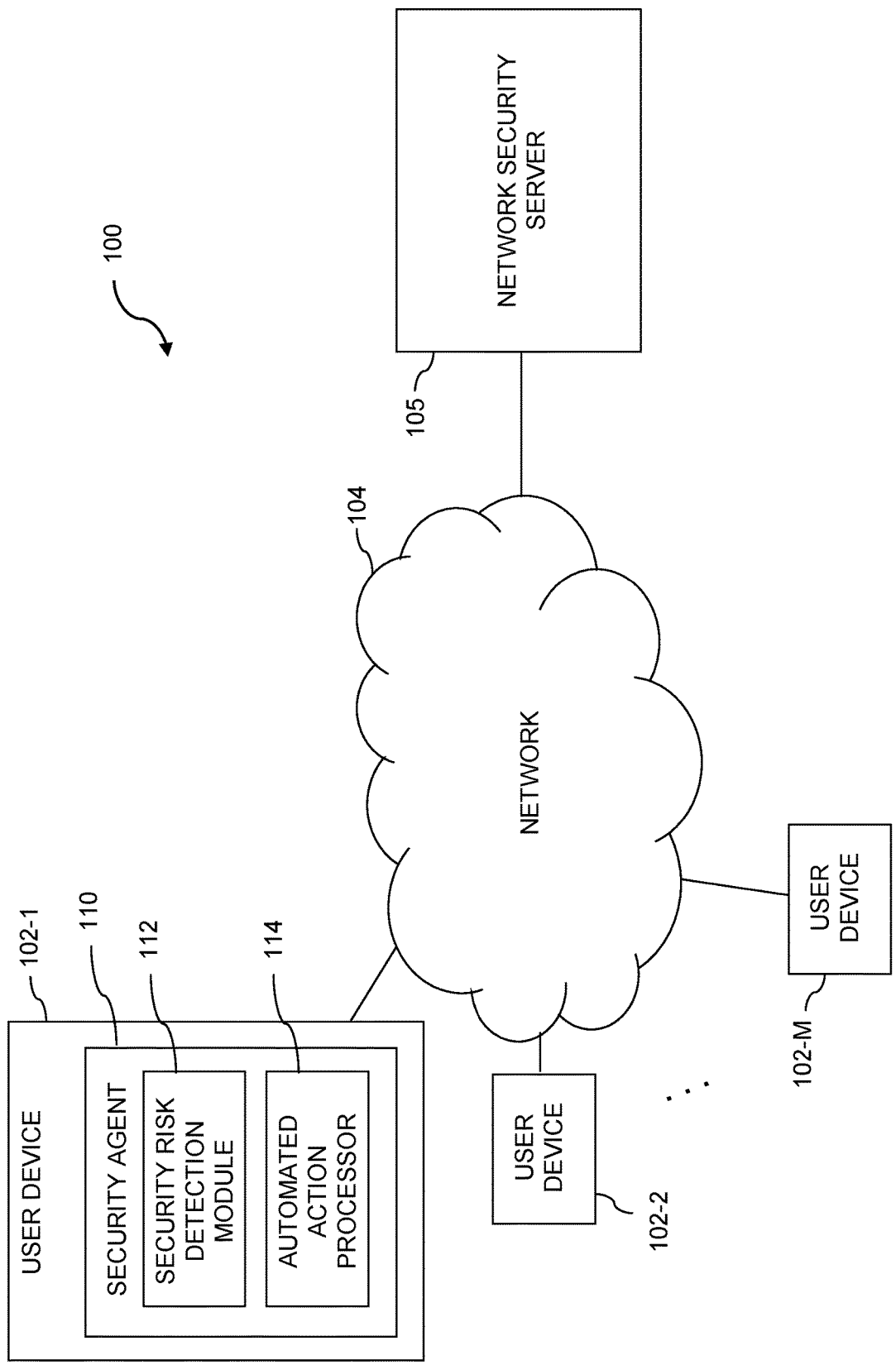
FIG. 1 shows an information processing system configured for automated detection of user device security risks related to process threads and corresponding activity in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is network security server 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The network security server 105, in connection with one or more embodiments, is configured to process information pertaining to detected security risks (e.g., suspicious threads and activities corresponding thereto detected by one or more of the user devices 102) and carry out one or more automated actions in response to such detected security risks. Also, in one or more embodiments, the network security server 105 is responsible for consuming data from the user devices 102. While processing such data, the network security server 105 determines if any of the threads are suspicious, assigns an appropriate risk identifier to the corresponding process(es) and device(s), and raises one or more related alerts.

Additionally, the network security server 105 can have an associated database configured to store data pertaining to security risks and devices within the network, which comprise, for example, process data, thread data, image data, and/or data related to actions taken in connection with detected security risks.

Such a database in the present embodiment can be implemented using one or more storage systems associated with the network security server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and/or the network security server 105 can be input-output devices, which illustratively comprise keyboards, displays or other types of input-output devices in any combination. Such input-output devices can be used, for example, to support one or more user interfaces to user devices 102 and/or the network security server 105, as well as to support communication between user devices 102 and/or the network security server 105 and other related systems and devices not explicitly shown.

Each user device 102 (and the network security server 105) in the FIG. 1 embodiment is assumed to be implemented using at least one processing device. Each such processing device generally comprises at least one processor and an associated memory, and implements one or more functional modules for controlling certain features of the user device 102.

More particularly, user devices 102 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the user devices 102 to communicate over the network 104 with other user devices 102 and/or the network security server 105, and illustratively comprises one or more conventional transceivers.

As also depicted in FIG. 1, each user device 102 further comprises a security agent 110, wherein the security agent 110 includes a security risk detection module 112 and an automated action processor 114.

It is to be appreciated that this particular arrangement of modules 112 and 114 illustrated in the security agent 110 of the FIG. 1 embodiment is presented by way of example only, and alternative arrangements can be used in other embodiments. For example, the functionality associated with the modules 112 and 114 in other embodiments can be combined into a single module, or separated across a larger number of modules. As another example, multiple distinct processors can be used to implement different ones of the modules 112 and 114 or portions thereof.

At least portions of the security risk detection module 112 and automated action processor 114 may be implemented at least in part in the form of software that is stored in memory and executed by a processor.

It is to be understood that the particular set of elements shown in FIG. 1 for automated detection of user device security risks related to process threads and corresponding activity involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing security risk detection module 112 and an automated action processor 114 of a security agent 110 contained within an example user device 102 in computer network 100 will be described in more detail with reference to the flow diagram of FIG. 6.

Accordingly, at least one embodiment of the invention includes automatically detecting user device security risks related to process threads and corresponding activity. For example, such an embodiment can include detecting and reporting suspicious and/or malicious activities originating from shell code as and/or when such activities occur. Further, such an embodiment can include determining if any network connections, file activity, process interactions, and/or registry operations are being carried out by a process originating from one or more threads detected and/or identified as suspicious or malicious. As used herein, a thread refers to a sequence of programmed (computing device) instructions that can be managed independently by a scheduler. As also used herein, a process refers to an instance of a computing device program that is being executed by one or more threads, wherein a process contains program code and its corresponding activity. Additionally, as used herein, a suspicious thread refers to a thread in a process which contains malicious code that is intended to cause one or more undesired effects, one or more security breaches, and/or damage to a system and/or computing device.

As detailed herein, in at least one embodiment, a security agent (e.g., security agent 110 in the FIG. 1 embodiment) is implemented within and/or in associated with a user device, wherein the security agent maintains information (such as path, filename, user, etc.) about the active processes that are currently running on the user device. To track the creation of suspicious threads, such a security agent can also maintain information about the images that are loaded into memory of the user device (and associated with one or more of the active processes on the device).

After registering the user device to a kernel callback related to image loading using a particular application programming interface (API) (e.g., a P sSetLoadlmageNotiftRoutine API), a security agent is notified every time an image is loaded into a process (actively running on the user device). This callback can provide information about the image being loaded, wherein such information can include, for example, identification of associated process(es), image path, image start address, image end address, image size, etc. The security agent can register to the callback and maintain a list of all images that are loaded for each process (e.g., maintain such information as a linked list). Further, in one or more embodiments, each time a new image is loaded into memory at a given start address, the security agent determines if there is an overlap of the image memory into a loaded module address space, and removes that unloaded module from the list if appropriate. As used herein, a loaded module address space refers to the memory location in a process where a module (e.g., a dynamic library link (DLL)) is loaded. Address space is identified by a base address and the corresponding size.

Similar to the image load notification mechanism detailed above, at least one embodiment can also include registering a user device to a kernel callback related to thread creation using a particular API (e.g., PsSetCreateThreadNotiftRoutine). This callback can provide information about new thread that is being created, wherein such information can include, for example, identification of the process creating the thread, identification of the process in which the thread is being created, thread start address, thread end address, thread identifier (ID), etc. The security agent can register to the callback to track new threads that are being created.

In one or more embodiments, for every new thread that is created, the security agent determines if the thread start address is within the range of one of the loaded images. If the thread start address is not within the range of one of the loaded images, then the security agent can mark the thread as suspicious and generate an event (e.g., a security risk event) indication. As used herein, an event refers to information that is sent by a device to a server, wherein such information provides contextual information about an action that occurred in the device. In one or more embodiments, such contextual information can include details about the suspicious thread that was created and the actions that the suspicious thread has performed. Such an event indication can include information such as file-related information, process-related information, registry-related information, etc. Also, in such an embodiment, the operating system (OS) of the user device can provide the ThreadID of the thread that is performing the operation, and if the ThreadID is the same as a (detected) suspicious ThreadID, then the security agent can flag the event indication as being performed by a suspicious thread. Using this flag information, at least one embodiment can include creating and/or modifying one or more rules pertaining to detecting such types of events.

Once a security agent registers with both of the above-noted callbacks, the security agent, in one or more embodiments, can detect suspicious threads by carrying out the following steps. For example, the security agent can add a process information structure (PROCESS_INFO) to a cache map for all newly-created processes. Additionally, when the image load callback is called, the security agent can obtain the PROCESS_INFO structure of the process in question using process identifier (PID) of the process. Further, the security agent can create and initialize an image load information structure (IMAGE_LOAD_INFO), such as detailed, for example, in FIG. 2. Also, the security agent can append the IMAGE_LOAD_INFO structure to the list of loaded images in the PROCESS_INFO structure.

FIG. 2 shows example pseudocode for creating an image information structure in an illustrative embodiment. In this embodiment, pseudocode 200 is executed by or under the control of a processing device, such as user device 102, or another type of processing device. For example, the pseudocode 200 may be viewed as comprising a portion of a software implementation of at least part of security agent 110 of the FIG. 1 embodiment.

The pseudocode 200 illustrates a C language structure that contains information about a loaded module image address space in a process (i.e., the image base address, the size of image, etc.).

It is to be appreciated that this particular pseudocode shows just one example implementation of a process for creating an image information structure, and alternative implementations of the process can be used in other embodiments.

In at least one embodiment, when a thread creation callback is called, a security agent can obtain the PROCESS_INFO structure of the process in question using the PID of the process, and the security agent can also query the start address of the (created) thread. If the start address of the newly-created thread is not within the range of any of the loaded images (i.e., Range=Between (Image Start Address, Image Start Address+Image Size), then the security agent can create and initialize a suspicious thread structure (SUSPICIOUS_THREAD), such as detailed, for example, in FIG. 3. Additionally, the security agent can append the SUSPICIOUS_THREAD structure to the list of suspicious threads, and report the event which can includes information about the process that is creating the thread and/or information about the process in which the thread is being created.

Figure 3:
FIG. 3 shows example pseudocode for creating a thread information structure in an illustrative embodiment.

FIG. 3 shows example pseudocode for creating a thread information structure in an illustrative embodiment. In this embodiment, pseudocode 300 is executed by or under the control of a processing device, such as user device 102, or another type of processing device. For example, the pseudocode 300 may be viewed as comprising a portion of a software implementation of at least part of security agent 110 of the FIG. 1 embodiment.

The pseudocode 300 illustrates a C language structure that contains information about a suspicious thread detected in a process, wherein such information includes the thread ID and the thread start address.

It is to be appreciated that this particular pseudocode shows just one example implementation of a process for creating a thread information structure, and alternative implementations of the process can be used in other embodiments.

Figure 4:
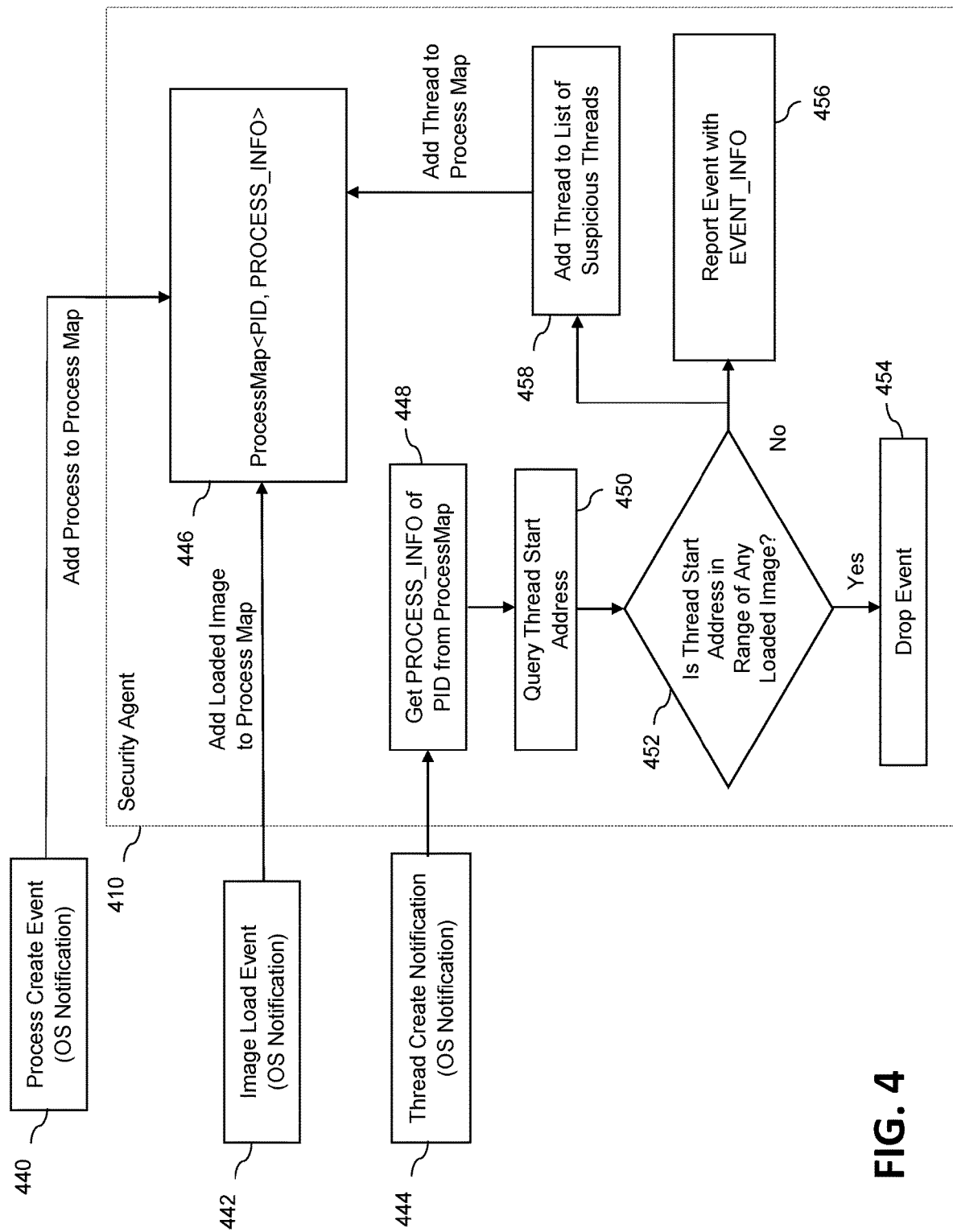
FIG. 4 is a flow diagram of a process for detecting suspicious threads in an illustrative embodiment.

FIG. 4 is a flow diagram of a process for detecting suspicious threads via security agent 410 in an illustrative embodiment. By way of illustration, FIG. 4 depicts a process creation event notification 440, in response to which, information pertaining to the process in question is added to the process map 446 of the security agent 410. Also, FIG. 4 depicts an image load event notification 442, in response to which, information pertaining to the loaded image is added to the process map 446. Additionally, FIG. 4 depicts a thread creation notification 444, which is obtained by the security agent 410 and used in step 448 to obtain the PROCESS_INFO structure of the PID (of the added process) from the process map 446. As illustrated in FIG. 4, the process map 446 can include the PID of the process(es) in question, as well as one or more related PROCESS_INFO structures, which can include information pertaining to path, arguments, and user information, and can also include at least one list of loaded image information (List<IMAGE_LOAD_INFO>) and at least one list of suspicious threads (List<SUSPICIOUS_THREAD>). Example IMAGE_LOAD_INFO can include, for example, information pertaining to path, start address, and/or end address.

Subsequent to step 448, step 450 includes querying the thread start address (for the created thread identified in notification 444), and step 452 includes determining whether the threat start address is within the range of any of the loaded images (associated with process map 446). If yes (i.e., the threat start address is within the range of at least one of the loaded images), then the event is dropped in step 454. If no (i.e., the threat start address is not within the range of any of the loaded images), then step 456 includes reporting the event along with event information (EVENT_INFO), and step 458 includes adding the thread to the at least one list of suspicious threads (List<SUSPICIOUS_THREAD>) in process map 446. The EVENT_INFO included in the reporting in step 456 can include information related to the creator process and/or the target process. Additionally, the SUSPICIOUS_THREAD can include information such as, for example, Thread_ID, start address, etc.

Figure 5:
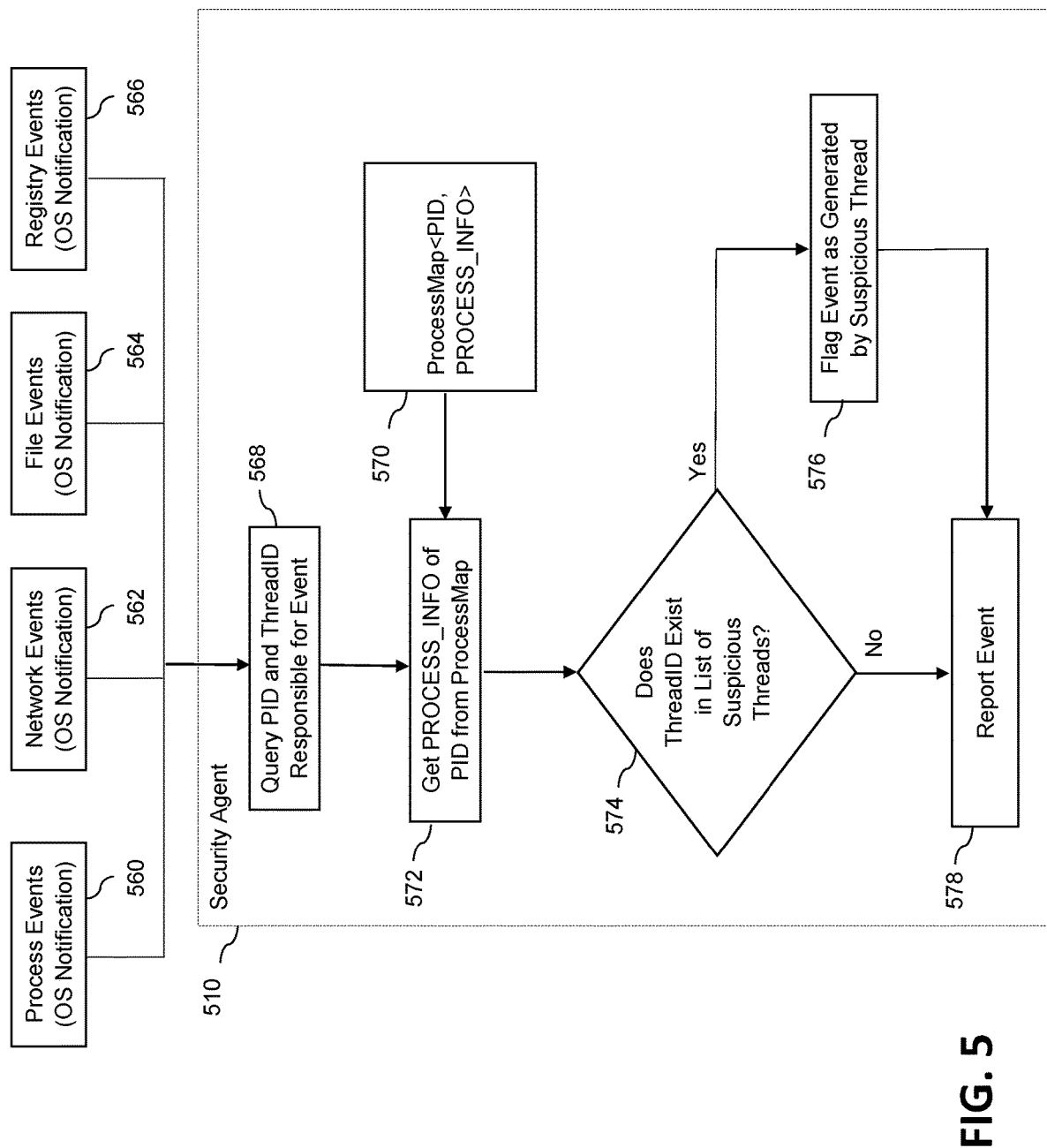
FIG. 5 is a flow diagram of a process for identifying and reporting events generated by suspicious threads in an illustrative embodiment.

FIG. 5 is a flow diagram of a process for identifying and reporting events generated by suspicious threads via security agent 510 in an illustrative embodiment. By way of illustration, FIG. 5 depicts process events notification 560, network events notification 562, file events notification 564, and registry events notification 566, all of which are obtained by and/or provided to security agent 510. Using these inputs, step 568 includes querying the PID and ThreadID responsible for one of the events (i.e., the events included in the input notifications). Step 572 includes obtaining PROCESS_INFO of the PID from process map 570.

Also, step 574 includes determining whether the ThreadID exists in a list of suspicious threads. If no (that is, the ThreadID does not exist in a list of suspicious threads) then the event is reported in step 578. If yes (that is, the ThreadID exists in a list of suspicious threads), the event is flagged in step 576 as generated by a suspicious threat, and then reported in step 578.

Accordingly, in one or more embodiments, the security agent implements at least one algorithm to identify and report events generated by suspicious threads as suspicious and/or a security risk. By way of example, such an algorithm can include the following. In connection with an event callback (e.g., a process event callback, a network event callback, a file event callback, and/or a registry event callback), the algorithm queries the PID and the ThreadID responsible for the event. Additionally, the algorithm obtains the PROCESS_INFO of the process using the PID, wherein the PROCESS_INFO can include PID, path information, arguments, user information, List<IMAGE_LOAD_INFO>, List<SUSPICIOUS_THREAD>, etc. If the ThreadID exists in the list of suspicious threads, the event is flagged and/or identified as generated by a suspicious thread and reported.

Figure 6:
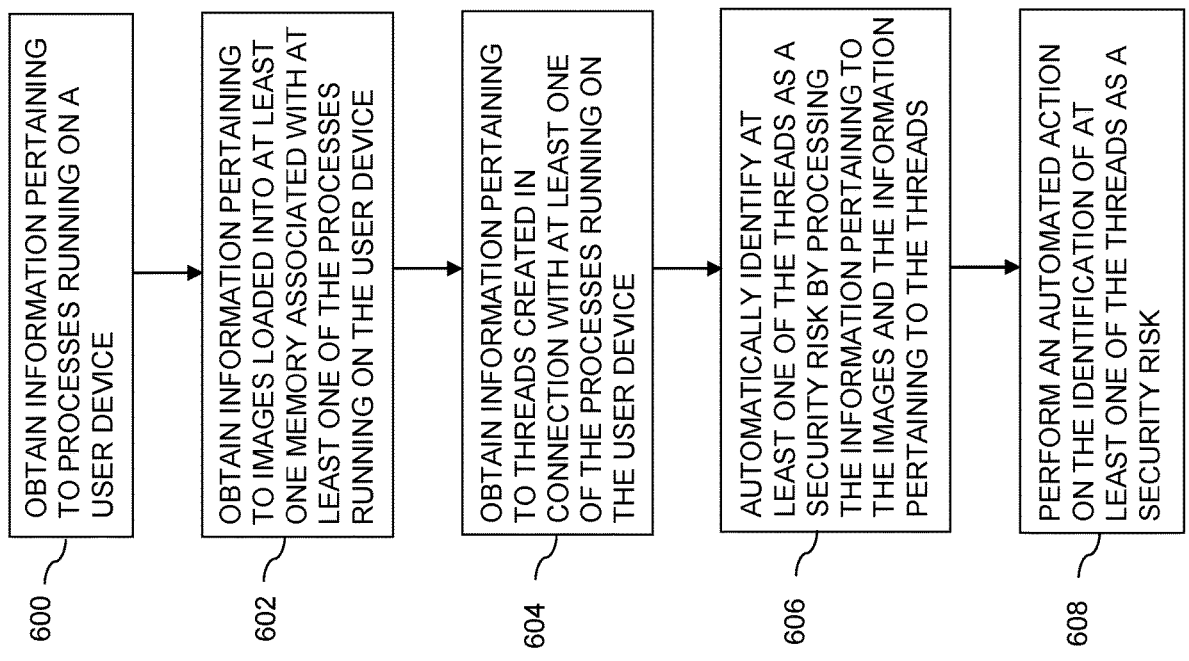
FIG. 6 is a flow diagram of a process for automated detection of user device security risks related to process threads and corresponding activity in an illustrative embodiment.

FIG. 6 is a flow diagram of a process for automated detection of user device security risks related to process threads and corresponding activity in an illustrative embodiment. It is to be understood that this particular process is only an example, and additional or alternative processes can be carried out in other embodiments.

In this embodiment, the process includes steps 600 through 608. These steps can be performed, for example, by security agent 110 utilizing its modules 112 and 114.

Step 600 includes obtaining information pertaining to one or more processes running on a user device. In at least one embodiment, the information pertaining to the one or more processes running on the user device can include path-related information, filename information, and/or user information.

Step 602 includes obtaining information pertaining to one or more images loaded into at least one memory associated with at least one of the one or more processes running on the user device. Obtaining information pertaining to the one or more images can include registering to a kernel callback using at least one application programming interface. Also, in at least one embodiment, the information pertaining to the one or more images can include process association information, image path information, memory start address, memory end address, and/or image size information.

Step 604 includes obtaining information pertaining to one or more threads created in connection with at least one of the one or more processes running on the user device. Obtaining information pertaining to the one or more threads can include registering to a kernel callback using at least one application programming interface. Also, in at least one embodiment, the information pertaining to the one or more threads can include identification of the process creating a given one of the one or more threads, identification of the process in which a given one of the one or more threads is created, as well as identification of a memory start address, a memory end address, and/or thread identifier information.

Step 606 includes automatically identifying at least one of the one or more threads as a security risk by processing the information pertaining to the one or more images and the information pertaining to the one or more threads. In at least one embodiment, automatically identifying the at least one thread as a security risk includes, for each of the one or more threads created, analyzing a memory start address attributed to the thread and determining whether the memory start address attributed to the thread is within a memory address range of at least one of the one or more images loaded into the at least one memory associated with at least one of the one or more processes running on the user device. In such an embodiment, automatically identifying the at least one thread as a security risk can include automatically identifying the at least one thread as a security risk upon a determination that the memory start address attributed to the at least one thread is not within a memory address range of at least one of the one or more images. Additionally or alternatively, in at least one embodiment, automatically identifying the at least one thread as a security risk includes automatically identifying one or more activities carried out by the at least one thread identified as a security risk.

Step 608 includes performing at least one automated action based at least in part on the identification of at least one of the one or more threads as a security risk. Performing the at least one automated action can include automatically outputting the identification of at least one of the one or more threads as a security risk to a network security server. Also, at least one embodiment includes automatically performing one or more remedial actions with respect to the user device in response to input from the network security server.

As detailed herein, in one or more embodiments, the techniques depicted in FIG. 6 can be carried out by the user device.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform automated assessment of created process threads in conjunction with loaded images. These and other embodiments can effectively improve upon suspicious thread detection delays associated with conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
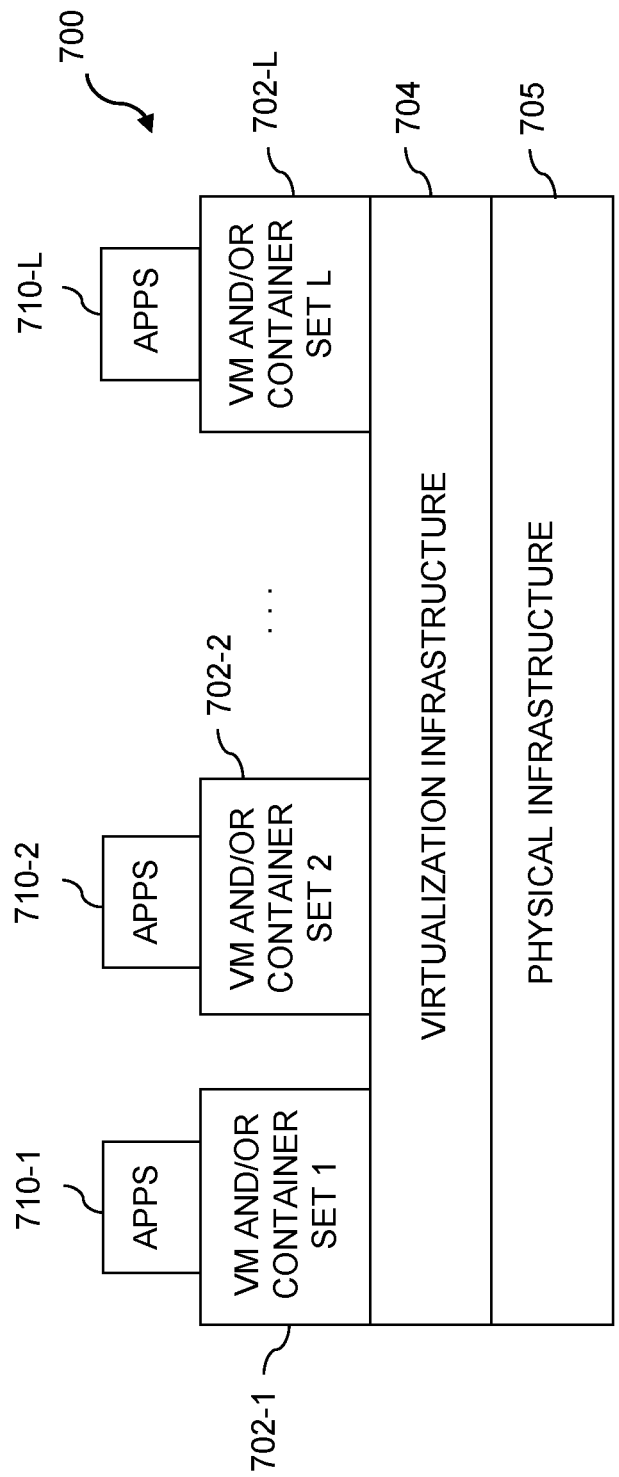
FIGS. 7 and 8 show examples of processing platforms that may be utilized to implement at least a portion of an information processing system in illustrative embodiments.
Figure 8:
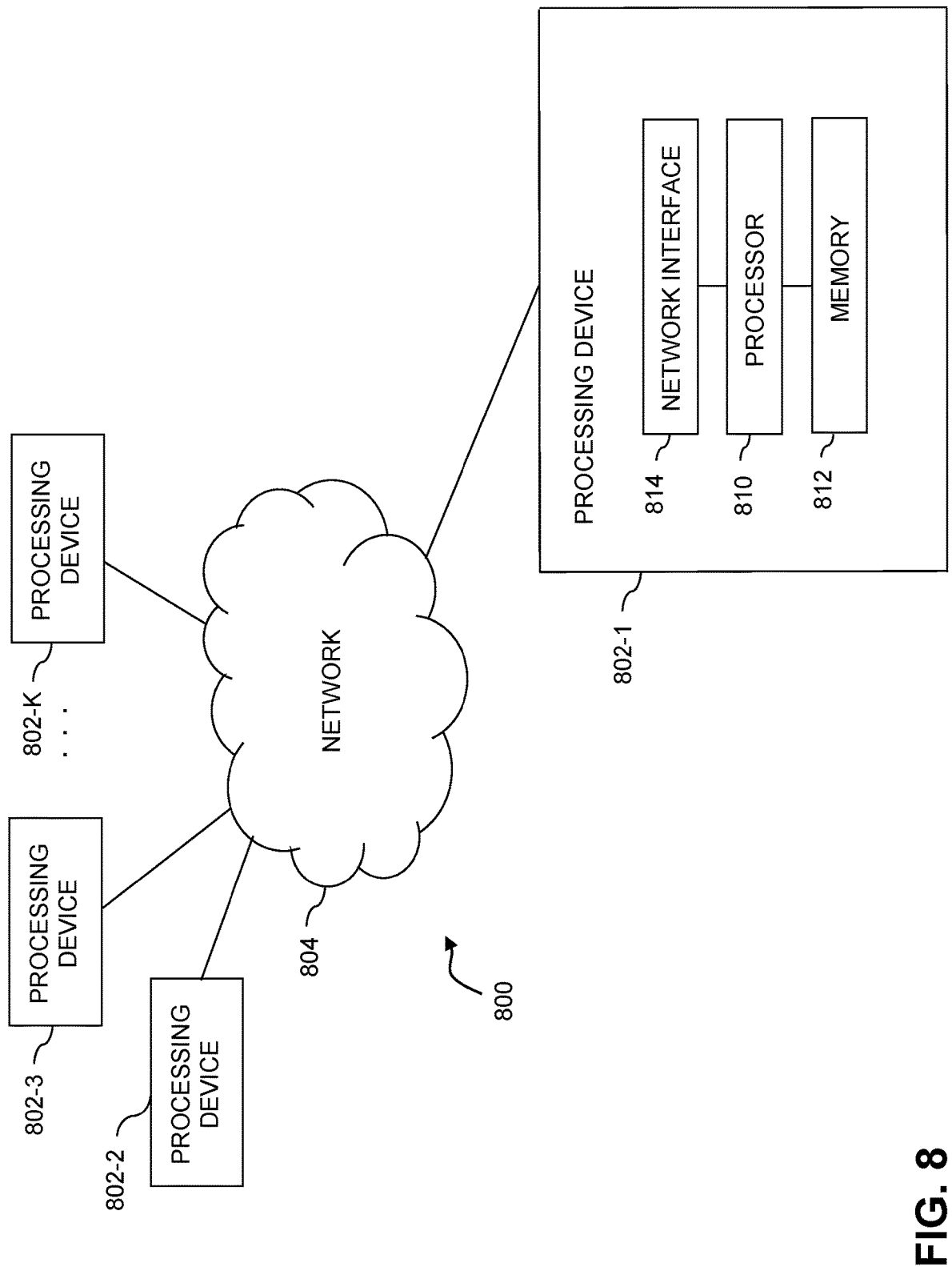

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, modules, systems and servers deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining information pertaining to one or more processes running on a user device;
obtaining information pertaining to one or more images loaded into at least one memory associated with at least one of the one or more processes running on the user device;
obtaining information pertaining to one or more threads created in connection with at least one of the one or more processes running on the user device;
automatically identifying at least one of the one or more threads as a security risk by analyzing a memory start address attributed to a thread and determining the memory start address attributed to the thread is not within a memory address range of at least one of the one or more images loaded into the at least one memory; and
performing at least one automated action based at least in part on the identification of at least one of the one or more threads as a security risk;
wherein the method is performed by at least one processing device comprising a processor coupled to a memory.

2. The computer-implemented method of claim 1, wherein performing at least one automated action includes providing contextual data about an action that occurred on the user device to a server, wherein the contextual data includes file-related information, process-related information, or registry-related information.

3. The computer-implemented method of claim 1, wherein automatically identifying the at least one thread as a security risk comprises automatically identifying one or more activities carried out by the at least one thread identified as a security risk.

4. The computer-implemented method of claim 1, wherein performing the at least one automated action comprises automatically outputting the identification of at least one of the one or more threads as a security risk to a network security server.

5. The computer-implemented method of claim 4, further comprising:
   automatically performing one or more remedial actions with respect to the user device in response to input from the network security server.

6. The computer-implemented method of claim 1, wherein obtaining information pertaining to the one or more images comprises registering to a kernel callback using at least one application programming interface.

7. The computer-implemented method of claim 1, wherein the information pertaining to the one or more images comprises at least one of: process association information, image path information, and image size information.

8. The computer-implemented method of claim 1, wherein obtaining information pertaining to the one or more threads comprises registering to a kernel callback using at least one application programming interface.

9. The computer-implemented method of claim 1, wherein the information pertaining to the one or more threads comprises at least one of: identification of the process creating a given one of the one or more threads, identification of the process in which a given one of the one or more threads is created, a memory start address, a memory end address, and thread identifier information.

10. The computer-implemented method of claim 1, wherein the information pertaining to the one or more processes running on the user device comprises at least one of: path-related information, filename information, and user information.

11. The computer-implemented method of claim 1, wherein the at least one processing device comprises the user device.

12. A non-transitory processor-readable storage medium having stored therein program code of one or more software programs, wherein the program code when executed by at least one processing device causes the at least one processing device:
   to obtain information pertaining to one or more processes running on a user device;
   to obtain information pertaining to one or more images loaded into at least one memory associated with at least one of the one or more processes running on the user device;
   to obtain information pertaining to one or more threads created in connection with at least one of the one or more processes running on the user device;
   to automatically identify at least one of the one or more threads as a security risk by analyzing a memory start address attributed to a thread and determining the memory start address attributed to the thread is not within a memory address range of at least one of the one or more images loaded into the at least one memory; and
   to perform at least one automated action based at least in part on the identification of at least one of the one or more threads as a security risk.

13. The non-transitory processor-readable storage medium of claim 12, wherein the program code causes the at least one processing device to perform the at least one automated action by providing contextual data about an action that occurred on the user device to a server, wherein the contextual data includes file-related information, process-related information, or registry-related information.

14. The non-transitory processor-readable storage medium of claim 12, wherein automatically identifying the at least one thread as a security risk comprises automatically identifying one or more activities carried out by the at least one thread identified as a security risk.

15. An apparatus comprising:
   at least one processing device comprising a processor coupled to a memory;
   the at least one processing device being configured:
   to obtain information pertaining to one or more processes running on a user device;
   to obtain information pertaining to one or more images loaded into at least one memory associated with at least one of the one or more processes running on the user device;
   to obtain information pertaining to one or more threads created in connection with at least one of the one or more processes running on the user device;
   to automatically identify at least one of the one or more threads as a security risk by analyzing a memory start address attributed to a thread and determining the memory start address attributed to the thread is not within a memory address range of at least one of the one or more images loaded into the at least one memory; and
   to perform at least one automated action based at least in part on the identification of at least one of the one or more threads as a security risk.

16. The apparatus of claim 15, wherein the at least one processing device is configured to perform the at least one automated action by providing contextual data about an action that occurred on the user device to a server, wherein the contextual data includes file-related information, process-related information, or registry-related information.

17. The apparatus of claim 15, wherein automatically identifying the at least one thread as a security risk comprises automatically identifying one or more activities carried out by the at least one thread identified as a security risk.

* * * * *